(12) United States Patent
Schmidt Zur Nedden et al.

(10) Patent No.: US 11,927,331 B2
(45) Date of Patent: Mar. 12, 2024

(54) LIGHTING APPARATUS HAVING A FLEXIBLE PLANAR LIGHTING ELEMENT

(71) Applicant: CARPETLIGHT GMBH, Hamburg (DE)

(72) Inventors: Goetz Schmidt Zur Nedden, Hamburg (DE); Laura Schmidt Zur Nedden, Hamburg (DE); Niklas Bastian, Hamburg (DE); Sebastian Chrost, Ahrensburg (DE); Daniela Meyer, Hamburg (DE)

(73) Assignee: CARPETLIGHT GMBH, Hamburg (DE)

( * ) Notice: Subject to any disclaimer, the term of this patent is extended or adjusted under 35 U.S.C. 154(b) by 0 days.

(21) Appl. No.: 18/085,782

(22) Filed: Dec. 21, 2022

(65) Prior Publication Data

US 2023/0141644 A1 May 11, 2023

Related U.S. Application Data

(63) Continuation of application No. PCT/EP2021/067465, filed on Jun. 25, 2021.

(30) Foreign Application Priority Data

Jun. 26, 2020 (DE) .......................... 102020116917.5

(51) Int. Cl.
*F21V 21/32* (2006.01)
*F21V 15/01* (2006.01)
(Continued)

(52) U.S. Cl.
CPC .............. *F21V 21/32* (2013.01); *F21V 15/01* (2013.01); *F21V 17/12* (2013.01);
(Continued)

(58) Field of Classification Search
CPC ...... F21V 21/32; F21V 15/01; F21V 19/0025; F21V 23/007
See application file for complete search history.

(56) References Cited

U.S. PATENT DOCUMENTS 7,374,315 B2 * 5/2008 Dorsey ..................... F21S 4/20
362/800
8,760,877 B2 6/2014 Bhattacharya et al.
(Continued)

FOREIGN PATENT DOCUMENTS

CN 108205987 A 6/2018
DE 10 2006 033 894 B4 5/2019
(Continued)

OTHER PUBLICATIONS

Hai-Jun Jin, et al., "A Material with Electrically Tunable Strength and Flow Stress", Science, vol. 332, Issue 6034, pp. 1179-1182 (2011).

*Primary Examiner* — Christopher E Dunay
(74) *Attorney, Agent, or Firm* — Scully, Scott, Murphy & Presser, P.C.

(57) ABSTRACT

A lighting apparatus including: a flexible planar light source having plural illuminants over a surface of a planar carrier material, which includes a flexible planar circuit carrier fitted with the illuminants on a side. The illuminants being interconnected by electrical lines formed in or on the circuit carrier, and a controller to supply power to the illuminants and control the illuminants. The controller includes a housing disposed on an edge of the planar light source and is mechanically connected to the planar light source, an edge of the planar light source being partly accommodated in the housing. The housing including electrical and electronic components and lines connected to the electrical lines of the planar light source. A strain relief is configured to absorb tensile stresses between the housing and the planar light (Continued)

source to keep the tensile stresses away from electrical connections between the controller and the planar light source.

20 Claims, 5 Drawing Sheets

(51) Int. Cl.
*F21V 17/12* (2006.01)
*F21V 19/00* (2006.01)
*F21V 23/00* (2015.01)
*F21Y 105/16* (2016.01)
*F21Y 107/70* (2016.01)
*F21Y 115/10* (2016.01)

(52) U.S. Cl.
CPC ........ *F21V 19/0025* (2013.01); *F21V 23/007* (2013.01); *F21Y 2105/16* (2016.08); *F21Y 2107/70* (2016.08); *F21Y 2115/10* (2016.08)

(56) References Cited

U.S. PATENT DOCUMENTS

| | | | |
|---|---|---|---|
| 9,869,456 B2 * | 1/2018 | Speer | H05K 1/189 |
| 10,595,469 B2 | 3/2020 | Golle et al. | |
| 2014/0254157 A1 * | 9/2014 | Engelen | E06B 9/24 |
| | | | 362/249.03 |
| 2014/0369038 A1 * | 12/2014 | Tischler | F21L 4/00 |
| | | | 362/249.08 |
| 2016/0091185 A1 | 3/2016 | Soderholm | |
| 2017/0254518 A1 * | 9/2017 | Vasylyev | F21V 19/003 |
| 2019/0137056 A1 * | 5/2019 | Sreshta | H02J 7/342 |
| 2020/0149714 A1 | 5/2020 | Tischler et al. | |
| 2021/0231271 A1 * | 7/2021 | Salta | F21V 15/012 |

FOREIGN PATENT DOCUMENTS

| | | |
|---|---|---|
| DE | 10 2014 206 882 B4 | 1/2020 |
| WO | 2020/010243 A1 | 1/2020 |

* cited by examiner

LIGHTING APPARATUS HAVING A FLEXIBLE PLANAR LIGHTING ELEMENT

CROSS-REFERENCE TO RELATED APPLICATION

The present application is a continuation of PCT/EP2021/067465 filed on Jun. 25, 2021, which is based upon and claims the benefit to DE 10 2020 116 917.5 filed on Jun. 26, 2020, the entire contents of each of which are incorporated herein by reference.

BACKGROUND

Field

The present disclosure relates to a lighting apparatus, having a flexible planar lighting element, which has a plurality of illuminants distributed over the surface of a planar carrier material, which carrier material can comprise a textile-based flexible planar circuit carrier, which circuit carrier can be fitted with the plurality of illuminants on a front side, the illuminants being interconnected by electrical lines formed in or on the circuit carrier.

Prior Art

Corresponding planar lighting elements are marketed, among others, by the applicant under the name Carpetlight and have been described, among others, in the German patent DE 10 2014 206 882 B4. They are designed for various applications, for example planar illumination in the field of photography, film and television shooting. Especially in the latter areas, continuous illumination with high luminous intensities is required, which in most cases is achieved by systems of spotlights, reflectors and diffusers. To illuminate changing scenes, the lighting system components used must be flexible to combine, place and align. To this end, DE 10 2014 206 882 B4 proposes to provide a flexible planar lighting element having a plurality of illuminants distributed over the surface of a planar carrier material, which carrier material has at least two layers, a first layer being formed as a textile-based flexible planar circuit carrier, which is fitted with the plurality of illuminants on a front side, the illuminants being interconnected by means of electrical lines formed in or on the circuit carrier, a second layer being formed as a flexible planar cooling layer and being connected to the circuit carrier on its rear side opposite the front side.

Such a planar lighting element represents, in simple terms, a self-luminous cloth that is bendable, rollable, foldable, rotatable, and crushable, and that has a luminosity distributed over the surface that is sufficient to illuminate, for example, a scene or part of a scene. Corresponding "cloths" or rather flexible planar lighting elements can be manufactured in any size and are therefore easy to make up. The fact that they correspond to known reflectors and diffusers in terms of their flexibility and planarity makes them suitable for replacing the known combinations of spotlights, reflectors and diffusers. They also manage with a lower luminous intensity, since their luminous intensity is fully available for illuminating a given scene and is not, as is the case with conventional spotlight systems, only incompletely deflected and diffused towards the scene. This also leads to a reduction in the waste heat generated.

US 2016/0091185 A1 discloses a lightweight, portable and flexible light bank having LED strips attached to a fabric and having a Velcro attachment system for attachment to various objects. The light bank can be rolled up and folded. Batteries can be removably attached to the back of the light bank.

SUMMARY

Accordingly, an object is to provide a lighting unit that allows more flexible use than before.

Such object can be solved by a lighting unit, comprising a flexible planar lighting element, such as a planar light source, which has a plurality of illuminants distributed over the surface of a planar carrier material, which carrier material comprises a flexible planar circuit carrier, which can be textile-based, the circuit carrier is fitted with the plurality of illuminants on a front side, the illuminants being interconnected by electrical lines formed in or on the circuit carrier, and a controller configured to supply power to and control the plurality of illuminants, the controller comprises a housing disposed on an edge of the planar lighting element and mechanically connected thereto, an edge of the planar lighting element being partly accommodated in the housing of the controller, the housing comprising electrical and electronic components and lines connected to the electrical lines of the planar lighting element, and a strain relief configured to absorb tensile stresses between the housing of the controller and the planar lighting element to keep the tensile stresses away (i.e., eliminate, reduce or minimize such tensile stresses) from the electrical connections between the controller and the planar lighting element.

Such lighting apparatus integrates the planar lighting element and the controller and configures the lighting apparatus to be robust and without external cables by a high-tensile connection of the planar lighting element to the housing of the controller. Such lighting apparatus can be used in a variety of situations. For example, the lighting apparatus can be transported in a rolled or wound up state and unrolled and hung, stuck, laid out, etc., where it is needed, depending on the circumstances of the situation and the attachment options that are available. An external power supply is not necessary if it is already integrated in the controller. However, the controller can also have a connection for an external power supply regardless of whether a power supply is integrated.

Cases of application for the use of the lighting apparatus would be, for example, the illumination of tents, also makeshift tents in the military field, in disaster control or in mobile medical facilities, in police use for the illumination of accident sites, as well as for private use, as well as for photographers who need a mobile planar illumination system outside their studios that can be set up quickly. This list is not exhaustive.

The circuit carrier can be textile-based, such as synthetic fiber-based, or alternatively configured as a flexible film, such as polymer-based, such as polyimide or polyurethane. These materials can offer, among other things, high flexibility and low weight with good resistance.

The strain relief can be configured to create a high-tensile connection between the material of the planar lighting element and the housing. This means that there can be a direct high-tensile connection between the planar lighting element and the housing.

In embodiments, the strain relief can be configured as a clamp, as a row of tension-absorbing pegs, which are guided through a row of eyelets in the planar lighting element configured to match the arrangement of the tension-absorbing pegs, or as spacers with internal threads and screws, which are screwed or can be screwed into the internal threads of the spacers, or as a cover, which is screwed or can be screwed or, alternatively, is clamped or can be clamped to or onto the housing and, can have a stop bar, which can be attached to the planar lighting element and configured to prevent the planar lighting element from being pulled out of the cover, the carrier material can be reinforced in the region of the eyelets or the spacers, such as by a double layer of the flexible planar circuit carrier. Such a clamp can grip the planar lighting element in sections from one side or from two sides and be equipped with a slip-preventing surface or profiling, for example with a rubber coating or a barbed or ribbed profile. A simpler but equally effective embodiment can be a series of pegs or pins extending transversely to the planar extent of the planar lighting element through eyelets along the edge of the planar lighting element. The tension-absorbing pegs or, alternatively, pins can be part of the housing of the controller, or at least can be permanently connected to it.

The electrical lines between the controller and the illuminants can be continuous, i.e. without interruption, and their respective ends can be directly connected, for example soldered, to the corresponding contacts of the controller and the illuminants. Alternatively, the electrical lines can have an interruption with a contacting, which can be disposed in the region of the strain relief, the contacting can be configured as a spring pin contacting with spring pins and opposing contact surfaces, which are contacted and secured by fastening of the strain relief, or as a pin strip with contact pins, which can be accommodated or are accommodated in corresponding contact pin receptacles.

Spring pin contacting can still provide secure electrical contacting even under mechanical stress, because the spring pins have some clearance for relative movement with respect to their respective opposing contact surfaces. Because the spring pins have a springy) biased tip, gaps between the parts to be contacted caused by excessive tension can also be tolerated to a limited extent without interrupting the electrical through-contacting. The spring pins can also be configured as spring pin strips, and the contact surfaces as contact pans.

The spring pin contacting can be configured in such a way that a textile planar lighting element can have a pre-board in the area of the transition to the controller, which pre-board provides the contact surfaces for the spring pins and, if necessary, the strain relief. The contact surfaces and spring pins can each be disposed between the strain relief, with the strain relief being configured to press the pre-board and a circuit board of the controller against one another. This ensures secure spring pin contact. A suitable strain relief in this case can be a combination of spacers with internal threads on one of the two circuit boards and throughholes or through-openings for screws that engage in the internal threads of the spacers. The corresponding openings may penetrate several or all layers of the planar lighting element.

Other strain relief may also be rivets, SMD spacers (i.e., a spacer designed as a "surface mounted device") with or without threads, or bolts for connecting the circuit boards. Thus, in further embodiments, the contacting may be such that a pre-board includes SMD sockets applied to the textile on its upper surface, into which SMD pins are inserted from the main board. This can be done in a vertical arrangement of the circuit boards on top of each other or in a horizontal configuration next to each other. The mechanical strain relief can be the same as described previously. The strain relief may be implemented alone or in addition to the previously described examples of strain relief.

An embodiment of the contacting with a pin strip with contact pins, which can be received or are received in corresponding contact pin receptacles, can be a simple and inexpensive possibility for the contacting. Since contacting is involved in which the contact pins of the pin strip are parallel, the contacting can be loaded in the direction of the alignment of the contact pins. In an embodiment, this happens in that the pin strip is received in a cover that is screwed or clamped to or onto the housing of the lighting apparatus. For this purpose, the housing can have a corresponding contact strip with contact pin receptacles for the contact pins of the pin strip and for matching screw or clamping structures that interact with matching screw or clamping structures on the cover.

In further embodiments, the strain relief can be configured such that an enclosure of the planar lighting element carrying the illuminants or the planar lighting elements themselves can have stop bars, such as keder strips, metal strips or plastic strips, which can have round, square, triangular or elliptical cross-sections, at their end edges towards the housing, which stop bars can be fixed to the housing behind a pushed-on attachment or rather frame. The stop bars can be sewn, glued or laminated, for example, to the planar lighting element, such as to layers enclosing the inner textile circuit carrier. In this case, a seal against water and environmental influences can be made on the inner module, which can be laminated or coated, by a clamping seal on an edge of the actual housing in such a way that the housing can become a single-chamber system.

The planar lighting element can remain completely or mostly outside the then already waterproof housing in embodiments with a stop bar or stop bars, and the stop bars can be disposed parallel to the housing wall outside the housing. Subsequently, an attachment or rather frame, for example made of plastic, metal or other suitable materials with a central recess, which can be optically closed by an upper and a lower flexible rubber lip, can be pulled over the planar lighting element and connected to the housing. The attachment or rather frame can then be disposed in front of the stop bars so that they remain in the space between the housing and the attachment or rather frame and cannot protrude through the central recess of the frame even under tension. This attachment or, respectively, frame can be connected to the housing by clamps and/or screw connections. The attachment or, respectively, frame can also be formed by an upper and a lower half shell, which grip over the stop bars and fix them against being pulled out.

In embodiments, the planar lighting element can have, on a rear side of the circuit carrier, a flexible planar cooling layer which can be mechanically or materially connected to the circuit carrier, and/or a rain- and dirt-repellent layer, such as the cooling layer being shielded on the outside by the rain- and dirt-repellent layer or being formed as a rain- and dirt-repellent layer. A rip-stop fabric can function as a rain- and dirt-repellent layer. The cooling layer can have the property that the waste heat generated during operation of the illuminants is dissipated better than if the cooling layer is not present. Materials with increased thermal conductivity can be used, for example fabrics that have metallic fibers or metallic coatings, and either consist of them or have an admixture of them. The illuminants, for example LEDs, heat up less than in the case without a cooling layer.

In further embodiments, the planar lighting element can have a diffusion layer, such as a removable diffusion layer, and/or a directional grating on a front side of the circuit carrier. A diffusion layer, also called a diffuser, can be a fabric or other layer that provides for uniformity of illumination and distributes some of the intensity generated directly at the location of the illuminants into the area between the illuminants and, if necessary, shapes a certain directionality of the radiated illumination that may be different from the original directionality of the illuminants themselves. This can lead to wider distribution. A directional grating can again narrow this directional distribution, whereby a very uniform and at the same time directed illumination is achieved, especially in combination with the diffusion layer. In addition or alternatively, a layer of absorbent cotton can also be used, such as between the diffuser and the illuminants, which in addition to a diffusion effect can also provide mechanical protection. The diffusion layer itself, if provided with a wadding-like structure, can also perform a mechanical protective function.

Such a diffusion layer can be configured as a three-dimensional spacer fabric, as a diffusion foil or several diffusion foils or as a textile fabric, such as being made of transparent or semitransparent plastic fibers, for example as a fabric made of PMMA fibers (polymethyl methacrylate) with mechanical surface treatment and/or polymer optical fibers (POF). POF are polymer-based optical fibers, using, for example, PMMA, polycarbonates, polystyrenes, silicones, polyether sulfones, polysulfones or polyetherimides as core material. A mechanical surface treatment, such as an abrasive treatment or a targeted application of imperfections, can provide irregularities or rather imperfections in the surface into which and from which light can enter and exit. Such a diffusion layer disperses the illumination light even more than is possible with the planar arrangement of the illuminants on the circuit carrier, and can be used when the uniformity of illumination achieved without a diffusion layer is still insufficient, such as when the distance to the illuminated objects or scenes is small.

The efficiency of the illumination can be increased if the circuit carrier below the illuminants is provided with a reflective surface, such as an aluminum layer. This can be a layer of its own or a coating, for example a complete or partial metal vapor deposition.

In embodiments that are configured for weather resistance, the circuit carrier with the illuminants and the electrical lines can be coated with a waterproof coating, such as silicone. Such a coating can also protect against the ingress of dust and foreign bodies and provide mechanical relief for the electronic components and lines on the planar lighting element and can also protect against short circuits. Suitable coatings can include air-curing silicones, water-repellent paints, membranes, laminations, or other water-repellent coatings.

In embodiments, the housing of the controller can include a perimeter seal at one or more openings configured to prevent moisture or liquids from entering the housing. Such a seal may be a neoprene seal and/or a silicone seal that is sealed by pressing or screwing together housing halves. This applies to all housing openings of the housing of the controller. For example, a neoprene seal can be used for sealing the opening through which the planar lighting element is inserted into the housing, but other sealing materials such as silicone can also be used at this location.

Further possible applications are opened up if a stiffenable frame is included which is connected or connectable to the planar lighting element circumferentially or at two or more points, the frame stretching the planar lighting element in the stiffened state and allowing the planar lighting element to be folded and/or rolled up together with the stiffenable frame in the unstiffened state. Such a planar lighting element does not necessarily require an external support or a support surface, but can be used in an upright position, since the flexible planar lighting element is supported by the integrated frame in its stiffened state. This also allows the lighting unit to be placed on the floor without the need for additional aids.

Various configurations can be used to implement the stiffenable frame. In some embodiments, the stiffenable frame can comprise an air- or fluid-tight inflatable tube that can be filled with air or a fluid and deflated again by an external pump or a pump integrated in the housing of the controller. Such a hose can be attached either circumferentially or at several points to the circumference of the planar lighting element and in this way can obtain a limitation of its shape in the inflated state. It may also be integrated into the planar lighting element at the edge.

In other embodiments, the stiffenable frame can include one or more sections in which is disposed a coil spring or a series of aligned tubes having internal tension wires connected on one side to a tightening device and on the other side to one end of the coil or series of aligned tubes, which can be stiffenable by tensioning the tension wires and can be made flexible by relieving tension on the tension wires by a stiffening device disposed in the controller.

In various embodiments, the stiffenable frame can have an O-shape, an X-shape, or a U-shape.

Where the frame is disposed at the front side of the planar lighting element, the surface of the frame may be configured to be connected to further layers, for example to a removable diffusion layer and/or a directional grating. This may be implemented, for example, in the form of a hook and loop fastener.

In further embodiments, the frame connected to the illumination device can include a metallic material based on porous nanostructures interspersed with an ionic liquid responsive to voltage. By applying an external voltage from the controller of the illumination device, this material can be reversibly stiffened into arbitrary shapes. Such a material was disclosed, for example, in Hai-Jun Jin, Jörg Weissmüller, "A Material with Electrically Tunable Strength and Flow Stress," Science, Vol. 332, Issue 6034, pp. 1179-1182. For example, the planar lighting element can be rolled out while the frame material is soft. Once the planar lighting element has been formed into the desired shape, the frame is stiffened by the application of the external voltage so that the planar lighting element maintains the shape once assumed.

For transportation purposes, it may be convenient for the lighting unit to be coiled and fixed in the coiled state. In embodiments, for this purpose, the planar lighting element can comprise fixing means for releasably fixing an end of the planar lighting element opposite the controller to another location of the housing or the planar lighting element, which fixing means can fix the lighting element in a state in which the planar lighting element is wound around the controller. Such a fixing means may be, for example, a push-button, a Velcro fastener or a magnet cooperating with a counterpart on the housing or on the underside of the planar lighting element. Alternatively, a technology that stiffens under voltage may also be used here.

For operation, waterproof operating elements, such as a membrane keypad, and/or a wireless communication interface via which the controller can be operated remotely by a remote controller or a mobile terminal can be provided.

BRIEF DESCRIPTION OF THE DRAWINGS

Further features will become evident from the description of embodiments, together with the claims and the appended drawings. Embodiments can fulfill individual features or a combination of several features.

The embodiments are described below, without restricting the general idea of the invention, based on exemplary embodiments in reference to the drawings, whereby we expressly refer to the drawings with regard to the disclosure of all details that are not explained in greater detail in the text. In the drawings.

In the drawings, the same or similar elements and/or parts are, in each case, provided with the same reference numerals such that they are not introduced again in each case.

DETAILED DESCRIPTION

Figure 1:
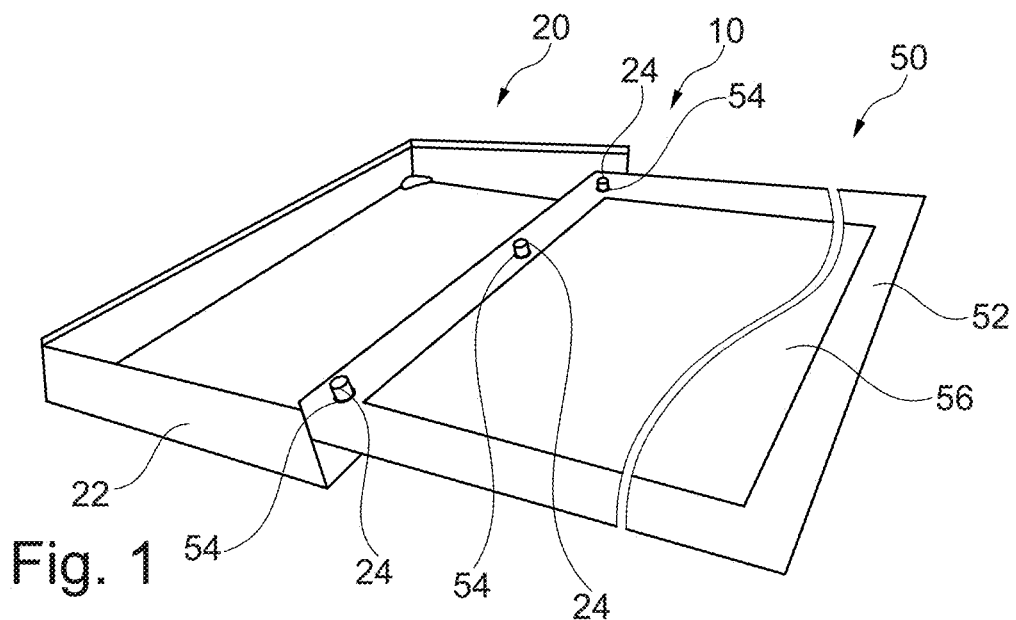
FIG. 1 illustrates a schematic perspective diagram of an embodiment with strain relief.

FIG. 1 shows an embodiment of a lighting apparatus 10 schematically in perspective. The lighting apparatus 10 comprises a controller 20, the housing 22 of which is shown in the open state, and without the electronic components disposed therein, such as circuit boards, batteries, circuits, control electronics, etc. The housing 22 has, on a transverse side, three tension-absorbing pegs 24 projecting from a lower surface of the housing 22, and onto which a planar lighting element 50, such as a planar light source, is fitted, the planar lighting element having for this purpose, on one of its edges, three eyelets 54, i.e., reinforced openings, which provide a tension-relieved fit of the planar lighting element 50 on the tension-absorbing pegs 24 in the housing 22. The planar lighting element 50 is flexible and planar in configuration, having a luminous area 56 surrounded by an edge 52, which is non-luminous or, respectively, need not be luminous.

Instead of strain relief by the tension-absorbing pegs 24 and eyelets 54, a clamping device not shown can also be used, which grips and clamps the planar lighting element 50 along one of its edges 52, optionally with a rubberized surface or with a profiled surface. The clamping is then performed along the side that has the eyelets 54 in the exemplary embodiment of FIG. 1.

Figure 2:
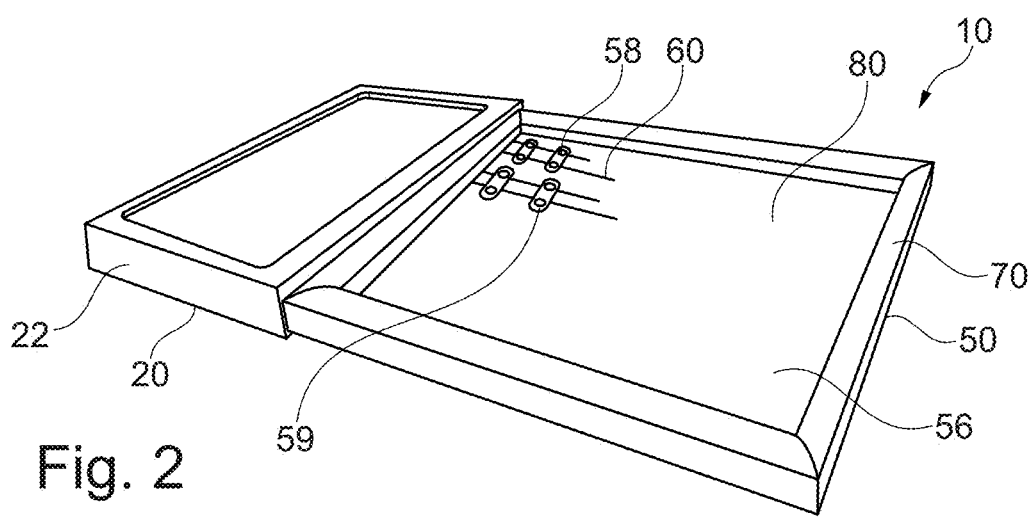
FIG. 2 illustrates a schematic perspective diagram of an embodiment from the outside.

In the exemplary embodiment in FIG. 2, a perspective schematic external diagram of a lighting apparatus 10 is shown, in which the housing 22 of the controller 20 is closed. Exiting the housing 22 is the planar lighting element 50, which has approximately the same width as the housing 22, and may be wider or narrower if necessary. Exemplary electrical lines 60 and LED illuminants 58 are shown in the luminous area 56, which actually fill the entire luminous area 56. It is indicated that the LEDs are each disposed on circuit boards 59, each of which is connected by two or more lines 60 that serve to supply power. Several different LEDs with different colors or color temperatures may also be used per circuit board, which LEDs are individually controlled to adjust the color temperature of the overall illumination. The embodiment is not limited to the selection of LEDs as illuminants.

The LED illuminants 58 and electrical lines 60 are applied to a circuit carrier 80, which may have a textile base, for example a textile cloth. Details of this are described in DE 10 2014 206 882 B4. The electrical lines and the circuit boards 59 may be sewn to the textile cloth, so that there is a connection between the electrical components and the circuit carrier 80 that is both secure and low-stress. The nature of the connection from the electrical connections to the textile circuit carrier 80 results in a structure that can be easily and repeatedly rolled and folded.

The edge of the planar lighting element 50 includes a circumferential stiffenable frame 70 in an O-shape. It is an inflatable tube that is filled with compressed air or other pressurizable hydraulic fluid. Once the tube is filled with compressed air or hydraulic fluid and pressurized, it expands to its maximum dimensions, stabilizing the planar lighting element 50. The tube can either be part of the planar lighting element 50 or circumferentially connected to it, for example with a Velcro fastener. Once the compressed air or hydraulic fluid is released, the planar lighting element 50 can be rolled up together with its stiffenable frame 70.

Figure 3:
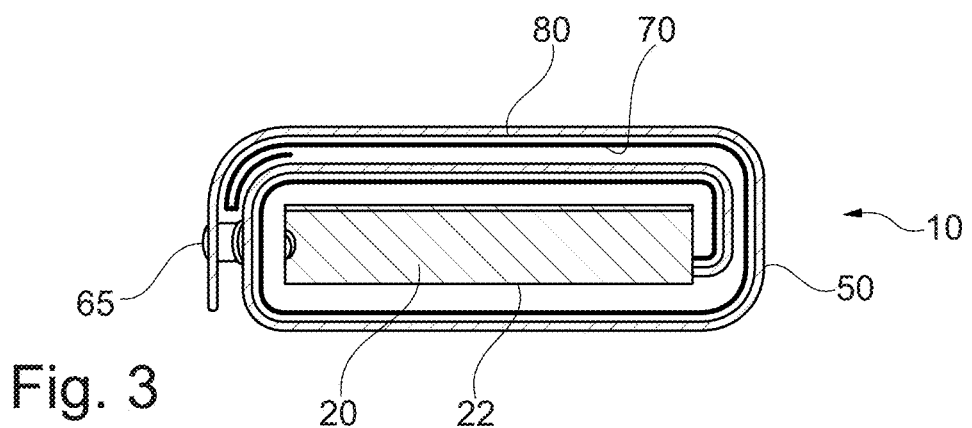
FIG. 3 illustrates a schematic cross-sectional diagram of an embodiment in the wound-up state.

FIG. 3 schematically shows an embodiment of a lighting apparatus 10 in a rolled-up state in cross-section. The planar lighting element 50 with the integrated frame 70 and the circuit carrier 80 is wound tightly around the housing 22 of the controller 20 and fixed at its end by a fixing means 65 in such a way that it does not unwind again on its own. In this initial example, the fixing means 65 is a push button. However, it can also be a Velcro fastener or a magnetic fastener. In this state, the rear side of the planar lighting element 50 is turned outward, which may be protected with a dirt- and rain-repellent material, so that the sensitive electrical and electronic components inside are protected against dirt and water.

Figure 4:
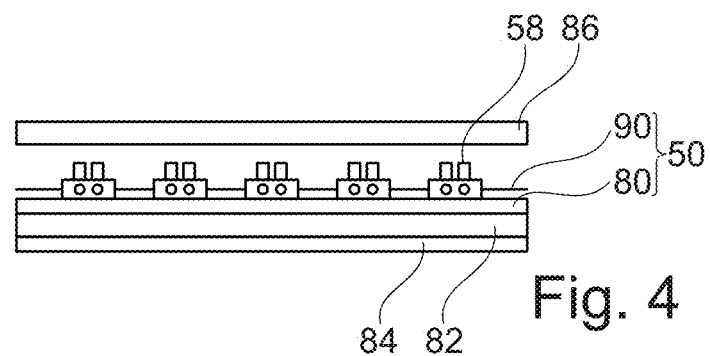
FIG. 4 illustrates a schematic diagram of a layer structure of an embodiment.

FIG. 4 illustrates a layer structure of an exemplary embodiment of a planar lighting element 50. LED illuminants 58 are disposed on the textile circuit carrier 80, and a reflective layer 90 is applied to the surfaces between the LED illuminants 58. Alternatively, instead of the reflective layer 90, a mechanical protective layer can be used, for example in the form of a plastic film that has mask-like recesses at the locations of the LED illuminants 58 and thus covers and electrically insulates the spaces between the LED illuminants 58. This film may itself also be metallized, thus providing a reflective layer 90.

On the backside of the circuit carrier 80 is a cooling layer 82, which is configured to absorb heat from the LED illuminants 58 and transfer it into the surface and to the backside, thereby lowering the temperature of the LED illuminants 58 themselves compared to a configuration that does not have a cooling layer 82. A rain and dirt repellent layer 84 is disposed on the back side of the cooling layer 82, for example made of a rip-stop fabric. The rain and dirt repellent layer 84 may be attached to the cooling layer 82, but may also be only marginally connected to the other layers, so that an air cushion may be formed between the cooling layer 82 and the rain and dirt repellent layer 84.

A diffusion layer 86 made of a diffusion fabric may be disposed on the front side, which is or will be connected to the circuit carrier 80 on the edge 52 of the planar lighting element 50.

Figure 5:
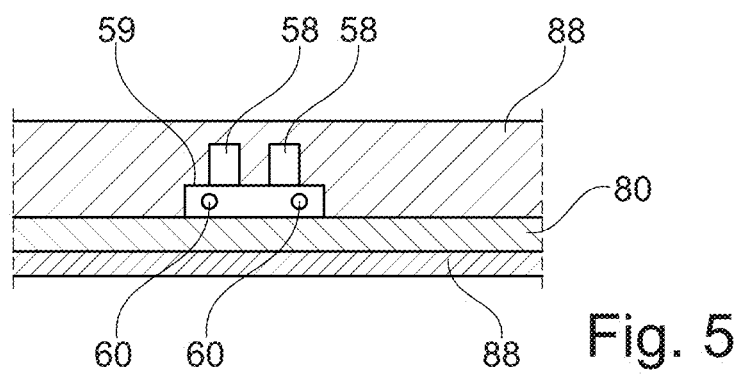
FIG. 5 illustrates a schematic detailed diagram of a further layer structure.

FIG. 5 shows a detail of another initial example in which the circuit carrier 80 is encased together with the LED illuminant 58 in a waterproof coating 88, such as a silicone coating. The coating 88 need not have the same thickness over the entire surface as shown, but may be thinner than shown in the area between adjacent LED illuminants 58. Also shown in this embodiment is a cross-sectional diagram of an LED illuminant 58 having circuit boards 59 and electrical lines 60, with the cross-sectional direction being transverse to the longitudinal extent of the electrical lines 60. The electrical lines 60 may be sewn onto the circuit carrier 80, for example, if it is a textile carrier. The two LEDs may have different color temperatures or colors. For example, one LED may produce a warm white while the other produces a cool white. A third LED (not shown) may also be included to provide red light illumination, which does not interfere with the human eye's adaptation to dark environments.

Figure 6:
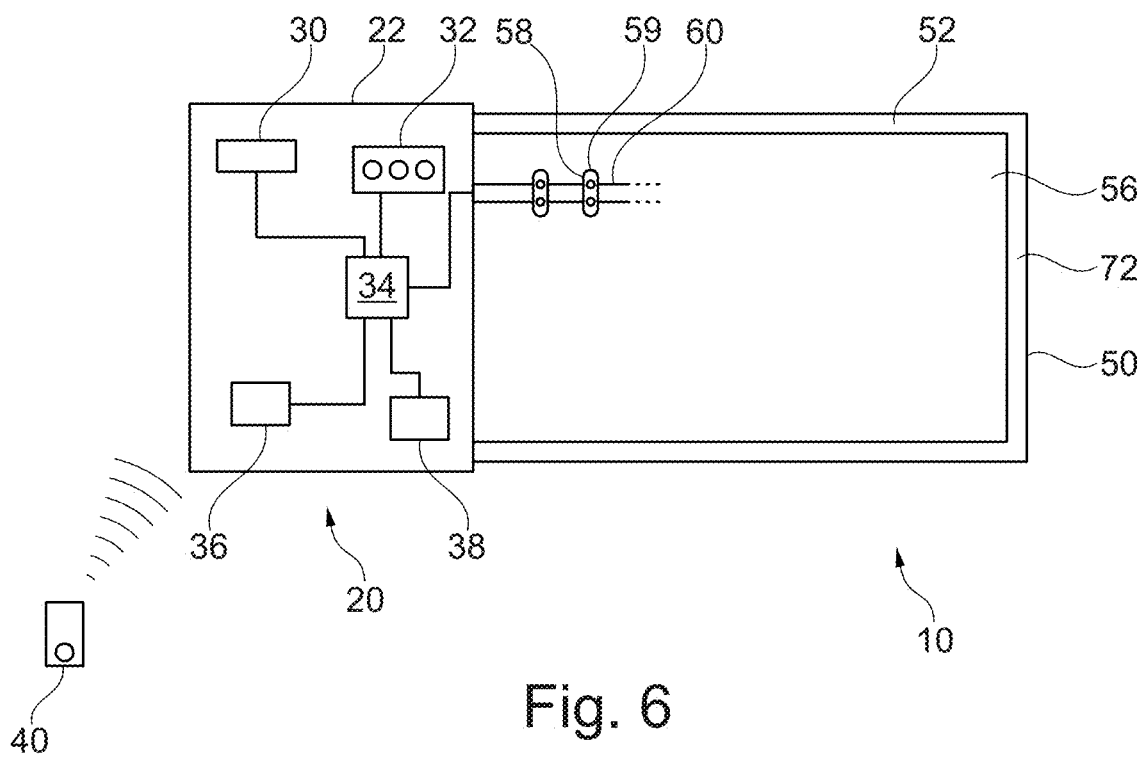
FIG. 6 illustrates a schematic diagram of the components of a controller of one embodiment.

In FIG. 6, an example of the electrical and electronic components in the controller 20 is shown schematically. A central component is control electronics 34, such as a processor, CPU, control circuits and the like, which are connected to a rechargeable or non-rechargeable battery 30 and may include charging electronics for a rechargeable battery 30. Further, the control electronics 34 are connected to and control the LED illuminants 58 via the electrical lines 60. A membrane keypad 32 is provided as an example of a manual input interface for communicating to the control electronics 34 how to control the LED illuminants 58.

Optionally, an electric pump 38 may be provided to inflate a U-shaped circumferential frame 72 in response to input and actuation by the control electronics 34 in order to stabilize the shape of the planar lighting element 50. In addition, a wireless communication interface 36 may be provided to receive signals from a remote controller 40, decode them, and transmit them to the control electronics 34. In this way, the operation of the lighting apparatus 10 can be controlled remotely.

Other possible components include pushbuttons, display elements, such as LEDs or screens, which are also to be integrated into the housing surface in a waterproof and dirtproof manner.

Figure 7A:
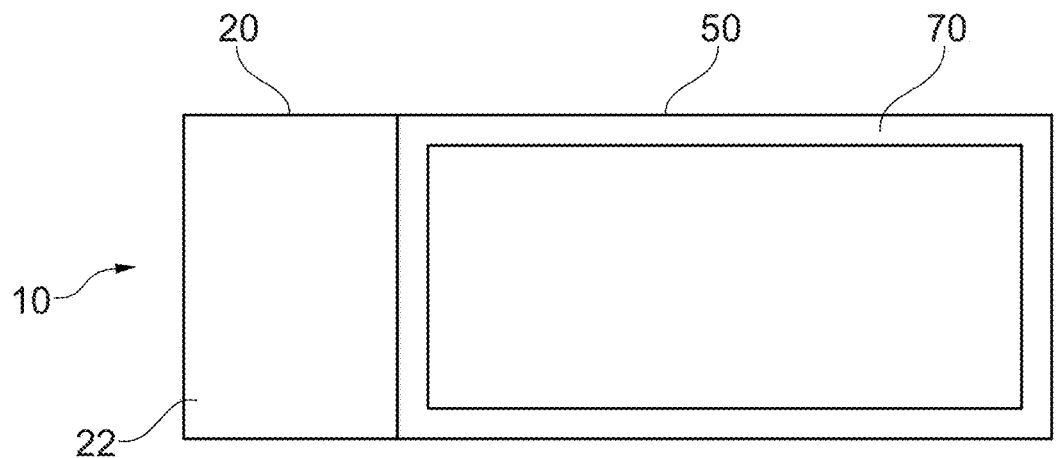
FIGS. 7a-7c illustrate various configurations of integrated stiffenable frames.
Figure 7B:
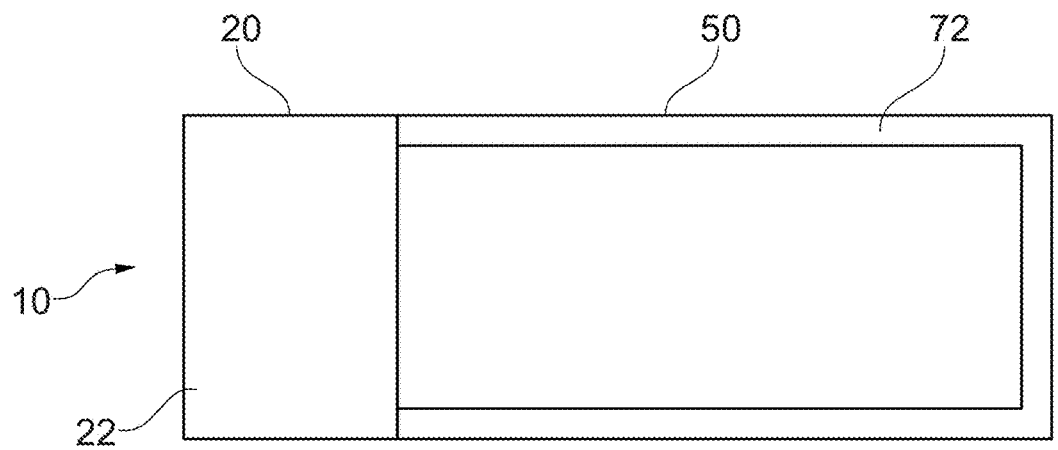
Figure 7C:
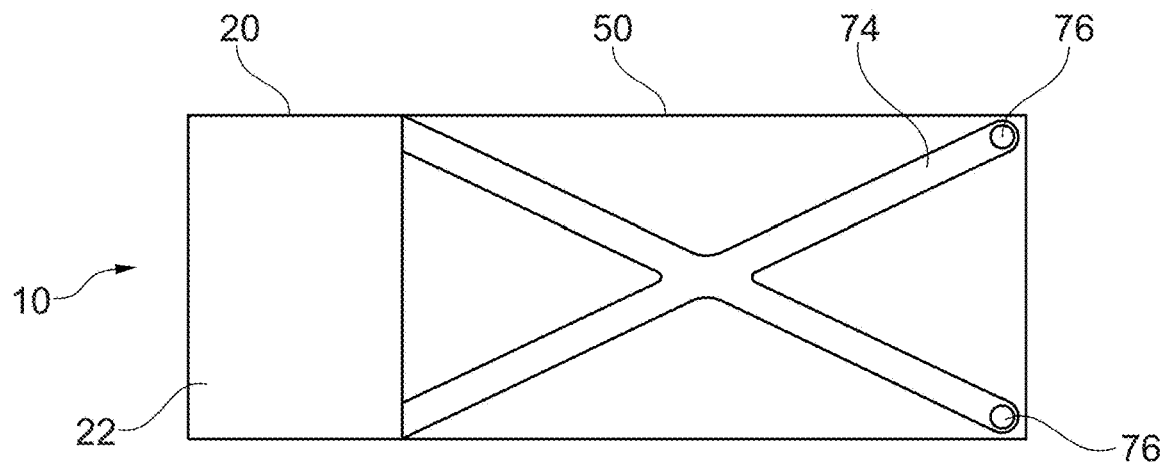

FIGS. 7a-7c show three exemplary embodiments of different configurations of stiffenable frames. In FIG. 7a, the frame is a circumferential O-shaped frame 70 that is connected to the planar lighting element 50 along its edge and stretches it when inflated. FIG. 7b shows a very similar configuration with a U-shaped circumferential frame 72, which is similarly connected to the planar lighting element 50 along its edge and stretches it when inflated. There may also be additional cross braces which exert outward pressure with respect to the long sides to additionally hold the planar lighting element 50 in shape.

A third embodiment is shown in FIG. 7c, in which the frame 74 has an X-shape. In this case, the frame is connected at its ends at the attachment points 76 to the planar lighting element 50 at its corners opposite the controller 20, and obtains its stability in the transverse direction from the X-shape. The X-shaped frame 74 is to be disposed at the rear side of the planar lighting element 50, while the 0- and U-shaped frames 70, 72 may be disposed either at the front side or the rear side of the planar lighting element 50.

All three of the inflatable frames 70, 72, 74 can be put in a slack state by releasing the compressed air or hydraulic fluid, in which state the lighting unit 10 can be rolled up from the controller 20.

As an alternative to the design of the frames 70, 72, 74 as tubes that can be filled with compressed air, other embodiments are possible. For example, the frames can also be filled with spirals, through each of which a pull wire is passed, which is connected at one side to the end of a spiral and is connected to a tensioning device within the housing 22 of the controller 20. When the tensioning device is actuated, tensile stress is applied to the tension wire, forcing the spiral into a close-fitting, inflexible configuration, thereby stabilizing it. Instead of a spiral, a series of cylindrical sections can also be used, through which a tension wire is passed accordingly, and which center on each other and support and stabilize each other when tension is applied.

Figure 8A:
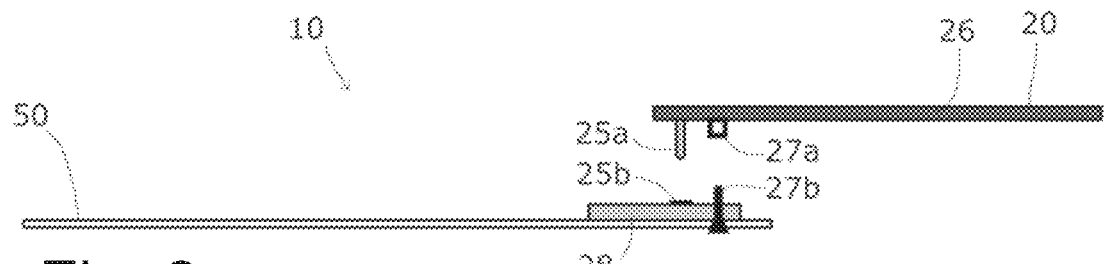
FIGS. 8a and 8b illustrate schematic diagrams of a further embodiment with strain relief.
Figure 8B:
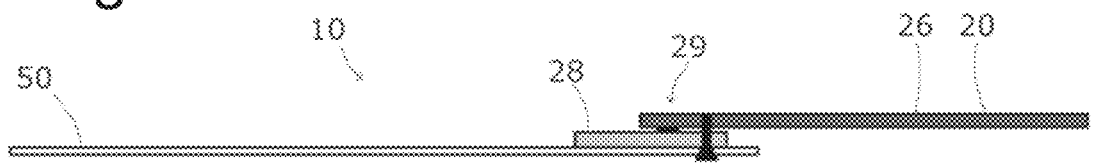
Figure 9:
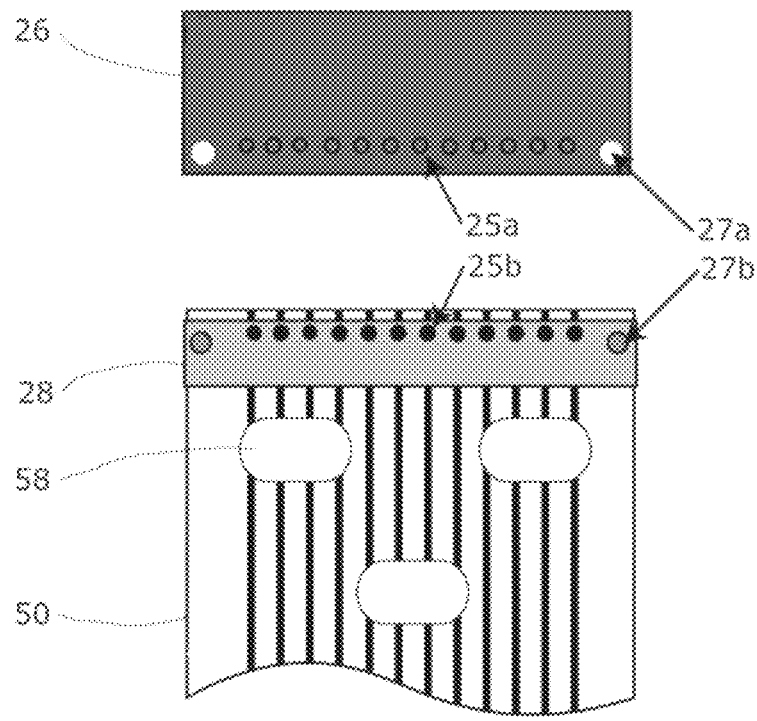
FIG. 9 illustrates schematic top view of the embodiment of FIG. 8.

FIGS. 8a, 8b and 9 schematically show another embodiment of a lighting apparatus 10 with strain relief. In the upper diagram, the main board 26 of the controller 20 is not yet connected to the textile planar lighting element 50. The main board 26 has on its edge a row of spring pins 25a disposed between two spacers 27a with an internal thread. The spring pins 25a can change their length because the tips are longitudinally axially movable and spring-biased. This can be seen in FIGS. 8a and 8b, where in the unassembled state (FIG. 8a) the spring pins 25a are at their full length and in the assembled state (FIG. 8b) they are retracted under the clamp load.

The planar lighting element 50 has a pre-board 28 that rests in a planar manner on and is connected to the textile substrate. The pre-board 28 has through openings for screws 27b, which are disposed such that the screws 27b engage in the internal threads of the spacers 27a when assembled. When the screws 27b are tightened, the pre-board 28 is pressed onto the main board 26. The pre-board 28 has a series of contact surfaces 25b which face the spring pins 25a in the assembled state of the main and pre-boards 26, 28. They establish the electrical through-contacting. The contact surfaces 25b are connected, for example soldered, on the opposite side of the pre-board 26 to the lines which lead to the illuminants 58 and supply them with power.

The arrangement of the rows of spring pins 25a and contact surfaces 25b between the spacers 27a and screws 27b creates a very effective strain relief and contacting 26. The mechanical loads are carried by the screws 27b and spacers 27a. The spring pin contacting is flexible and allows for some torsion of the contacting row without losing electrical contact.

Figure 10:
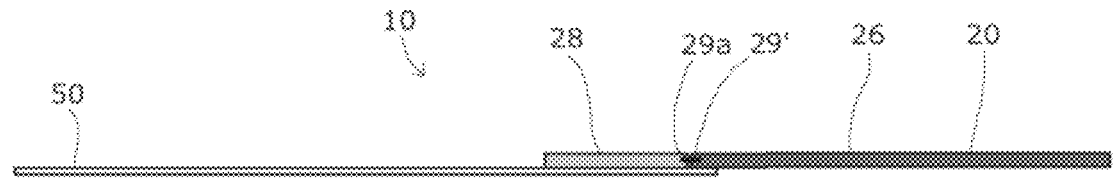
FIG. 10 illustrates schematic diagrams of a further embodiment with strain relief.
Figure 11:
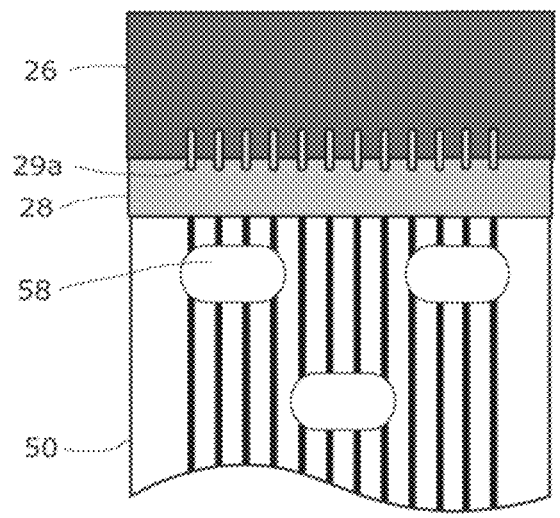
FIG. 11 illustrates a schematic top view of the embodiment of FIG. 10.

In FIG. 10, another embodiment of a strain relief is shown schematically. Compared to the embodiment of FIGS. 8a, 8b and 9, mainly the type of contacting is changed. The planar lighting element 50 is again provided with a pre-board 28, which is connected at its underside to the electrical lines on the planar lighting element 50. It has a pin strip 29a with contact pins aligned parallel to each other. The main board 26 has corresponding contact receptacles for receiving the contact pins of the pin strip 29a. This is shown in more detail in a schematic top view in FIG. 11.

Figure 12:
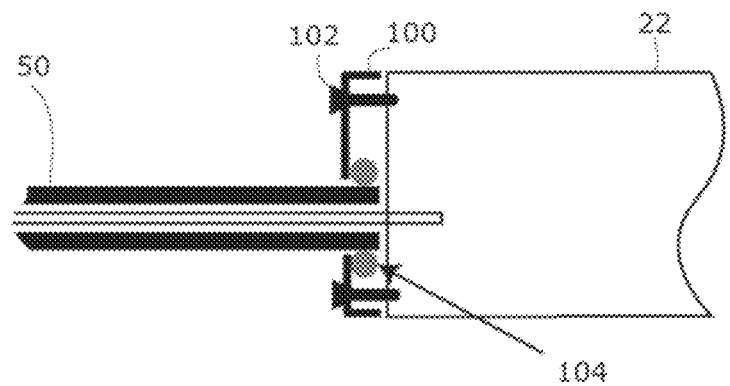
FIG. 12 illustrates a schematic cross-sectional diagram of the embodiment of FIG. 10.

This contacting 29' is not mechanically stable on its own and would be immediately separated again under tension. Therefore, as shown in cross-section in FIG. 12, a cover 100 or, alternatively, a frame is provided, which receives the end of the flat body 50 in an opening and is or will be screwed to or onto the housing 22. The main board 26 inside the housing 22 is not specifically shown in FIG. 12 for clarity reasons.

Behind the pre-board 28, the planar lighting element 50 is provided on at least one side, in the exemplary embodiment shown on both sides, with stop bars 104, which may be sewn on, glued on or the like. These prevent the planar lighting element 50 from being pulled out of the cover 100 or, alternatively, the frame again. Together with the cover 100, they act as a strain relief. The cover 100 may also be provided with sealing lips made of rubber, silicone or other suitable materials, against which the stop bars 104 are pulled or, alternatively, pressed and which reinforce the sealing effect exerted by the stop bars 104, such as if these are configured as keder strips.

While there has been shown and described what is considered to be preferred embodiments, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

LIST OF REFERENCE SIGNS

10 Lighting unit
20 Controller
22 Housing
24 Tension-absorbing peg
25a Spring pin
25b Contact surface
26 Main board
27a Spacer with internal thread
27b Screw
28 Pre-board
29, 29' Contacting
29a Pin strip
30 Battery
32 Membrane keypad
34 Control electronics
36 Wireless communication interface
38 Pump
40 Remote Controller
50 Planar lighting element
52 Edge
54 Eyelet
56 Luminous area
58 LED illuminant
59 Circuit board
60 Electrical lines
65 Fixing means
70 Stiffenable frame in O-shape
72 Stiffenable frame in U-shape
74 Stiffenable frame in X-shape
76 Attachment points
80 Circuit carrier
82 Cooling layer
84 Rain- and dirt-repellent layer
86 Diffusion layer
88 Waterproof coating
90 Reflective layer
100 Cover
102 Attachment of the cover to the housing
104 Stop bar

What is claimed is:

1. A lighting apparatus comprising:
a flexible planar light source comprising a plurality of illuminants distributed over a surface of a planar carrier material, the carrier material comprises a flexible planar circuit carrier fitted with the plurality of illuminants on a front side, the illuminants being interconnected by electrical lines formed in or on the circuit carrier, and
a controller configured to supply power to the plurality of illuminants and control the plurality of illuminants,
wherein the controller comprises a housing disposed on an edge of the planar light source and is mechanically connected to the planar light source, an edge of the planar light source being partly accommodated in the housing,
the housing comprising electrical and electronic components and lines connected to the electrical lines of the planar light source; and
a strain relief is configured to absorb tensile stresses between the housing and the planar light source to keep the tensile stresses away from electrical connections between the controller and the planar light source;
wherein electrical lines between the controller and the plurality of illuminants are configured to have an interruption with a contacting, which is disposed in a region of the strain relief; and
the contacting is configured as one of a spring pin contacting with spring pins and opposing contact surfaces, which are contacted and secured by fastening of the strain relief, or as a pin strip with contact pins, which is accommodated in corresponding contact pin receptacles.

2. The lighting apparatus according to claim 1, wherein the carrier material comprises a textile.

3. The lighting apparatus according to claim 1, wherein the strain relief is configured to create a high-tensile connection between the material of the planar light source and the housing.

4. The lighting apparatus according to claim 1, wherein the strain relief comprises one of:
a clamping device having a row of tension-absorbing pegs which are guided through a row of corresponding eyelets in the planar light source;
spacers with internal threads and corresponding screws screwed into the internal threads of the spacers; or
a cover one of screwed or clamped to or onto the housing.

5. The lighting apparatus according to claim 4, wherein the cover having a stop bar attached to the planar light source configured to prevent the planar light source from being pulled out of the cover.

6. The lighting apparatus according to claim 4, wherein the carrier material being reinforced in the region of one of the eyelets or the spacers.

7. The lighting apparatus according to claim 6, wherein the carrier material is reinforced by a double layer of the flexible planar circuit carrier.

8. The lighting apparatus according to claim 1, wherein the planar light source has, on a rear side of the circuit carrier one or more of:
a flexible planar cooling layer, which is mechanically or materially connected to the circuit carrier, and
a rain- and dirt-repellent layer.

9. The lighting apparatus according to claim 8, wherein the cooling layer being shielded on an outside by the rain- and dirt-repellent layer.

10. The lighting apparatus according to claim 8, wherein the cooling layer being formed as the rain- and dirt-repellent layer.

11. The lighting apparatus according to claim 1, wherein the circuit carrier further comprising a reflective surface.

12. The lighting apparatus according to claim 1, wherein the circuit carrier with the illuminants and the electrical lines is coated with a waterproof coating.

13. The lighting apparatus according to claim 1, further comprising a stiffenable frame connected to the planar light source at least partially circumferentially, the frame stretching the planar light source in the stiffened state and allowing the planar light source to be one or more of folded and rolled up together with the stiffenable frame in the unstiffened state.

14. The lighting apparatus according to claim 13, wherein the stiffenable frame comprises an air- or fluid-tight inflatable tube configured to be filled with air or a fluid and deflated by a pump.

15. The lighting apparatus according to claim 14, wherein the pump is disposed in the housing.

16. The lighting apparatus according to claim 13, wherein the stiffenable frame has one of an O-shape, an X-shape, or a U-shape.

17. The lighting apparatus according to claim 1, wherein the planar light source comprises fixing means for releasably fixing an end of the planar light source opposite the controller to another location of the housing or the planar lighting element, the fixing means fixes the planar light source in a state in which the planar light source is wound around the controller.

18. The lighting apparatus according to claim 1, wherein the controller comprises one or more of a membrane keypad, a wireless communication interface via which the controller can be operated remotely by means of a remote control.

19. A lighting apparatus comprising:
a flexible planar light source comprising a plurality of illuminants distributed over a surface of a planar carrier material, the carrier material comprises a flexible planar circuit carrier fitted with the plurality of illuminants on a front side, the illuminants being interconnected by electrical lines formed in or on the circuit carrier, and
a controller configured to supply power to the plurality of illuminants and control the plurality of illuminants,
wherein the controller comprises a housing disposed on an edge of the planar light source and is mechanically connected to the planar light source, an edge of the planar light source being partly accommodated in the housing,
the housing comprising electrical and electronic components and lines connected to the electrical lines of the planar light source;
a strain relief is configured to absorb tensile stresses between the housing and the planar light source to keep the tensile stresses away from electrical connections between the controller and the planar light source; and
a stiffenable frame connected to the planar light source at least partially circumferentially, the frame stretching the planar light source in the stiffened state and allowing the planar light source to be one or more of folded and rolled up together with the stiffenable frame in the unstiffened state.

20. The lighting apparatus according to claim 19, wherein the stiffenable frame comprises an air- or fluid-tight inflatable tube configured to be filled with air or a fluid and deflated by a pump.

* * * * *